Patented Mar. 2, 1954

2,671,109

UNITED STATES PATENT OFFICE 2,671,109

PREPARATION OF BIS-DIALKYLAMINO PHOSPHONOUS ANHYDRIDES

Gilbert Spencer Hartley, Fulbourn, and Denis William Pound, Cambridge, England, assignors to Pest Control Limited, Cambridgeshire, England, a British company No Drawing. Application November 16, 1949, Serial No. 127,792

8 Claims. (Cl. 260—545)

This invention relates to the manufacture of compounds containing phosphorus having insecticidal properties.

It is an object of the present invention to provide an improved process for the manufacture of insecticidal compounds containing phosphorus and in particular bis-dialkylamino phosphonous anhydrides.

It is a further object of the invention to use in such a process a tertiary amine which is of basic strength at least equal to that of pyridine and which does not undergo irreversible reaction with phosphorus oxychloride.

It is a further and more particular object of the invention to provide an improved process for the manufacture of bis-dialkyl phosphonous anhydrides.

Further objects of the invention will become apparent from the following description of the invention:

According to the process of the present invention for the manufacture of insecticidal compounds containing phosphorus and anhydrous dialkylamine is reacted with a solution of phosphorus oxychloride in an inert solvent in the presence of a tertiary amine which is of basic strength at least equal to that of pyridine and which does not undergo irreversible reaction with phosphorus oxychloride, and the product obtained is reacted with water and a tertiary amine which is of basic strength at least equal to that of pyridine.

The use of a tertiary amine which is of basic strength at least equal to that of pyridine and which does not undergo irreversible reaction with phosphorus oxychloride in the first stage of the reaction facilitates the process and produces an improved product. Tertiary amine may be added in this stage in sufficient quantity to enable the second stage of the reaction to occur without further addition of tertiary amine, in which case the second stage of the reaction requires the addition of water only. Alternatively, the tertiary amine which is of basic strength at least equal to that of pyridine necessary in the second stage may be added at that stage, prior to the addition of water. It is desirable that the hydrochloride of the tertiary amine should remain in solution at least during the first stage of the reaction. This can be effected by choosing the tertiary amine, solvent and concentration accordingly. Additional procedure is, therefore, necessary to recover the tertiary amine if it is desired on economic grounds to re-use it for another reaction.

Preferred examples of tertiary amines for use in the process are tertiary saturated alkylamines, e. g. methyl-dibutylamine, and N-dialkyl cycloalkylamines, e. g. N-diethylcyclohexylamine.

The preferred dialkylamine is dimethylamine.

A preferred embodiment of the invention will now be described with reference to the manufacture of bis-dimethylamino phosphonous anhydride.

In the first stage of the reaction, anhydrous dimethylamine, or a solution of this substance in an inert solvent, is metered into a solution of phosphorus oxychloride in the solvent, the tertiary amine which is of basic strength at least equal to that of pyridine, being present in one or both of these solutions, the proportions being chosen to correspond with the equation:

(1) $2(CH_3)_2NH + POCl_3 + 2NR_3$

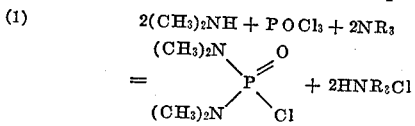

$= \begin{array}{c}(CH_3)_2N\\(CH_3)_2N\end{array}\!\!>\!\!P\!\!<\!\!\begin{array}{c}O\\Cl\end{array} + 2HNR_3Cl$ The tertiary amine $NR_3$ may be used with advantage in excess of the amount required by this equation. The solvent is used in a sufficient quantity to hold the tertiary amine hydrochloride in solution at the temperature of the reaction.

In the second stage of the reaction further tertiary amine and/or solvent may be added. On addition of further tertiary amine followed by water a reaction proceeds substantially in accordance with the equation:

(2)

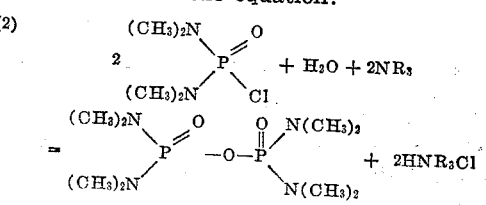

It has been found that, when pyridine is used as the tertiary amine in the second stage of the reaction, improved yields result if water is used in slight excess of the stoichiometric amount corresponding with Equation 2. When a tertiary saturated alkylamine is used, however, we find this undesirable, the maximum yield being obtained with the stoichiometric amount. Tertiary amine is preferably present in excess.

To enable the tertiary amine to be recovered together with the solvent one of several procedures may be adopted.

(a) Gaseous ammonia is next metered into the reaction product in slight excess over the amount required by the equation:

(3) $\quad NH_3 + HNR_3Cl = NH_4Cl + NR_3$

The ammonium chloride is very much less soluble than the hydrochloride of a suitable tertiary amine and is, therefore, precipitated from the solution and removed by filtration.

The solvent and tertiary amine may then be separated from the desired insecticidal product by (i) distillation or steam distillation at normal or reduced pressure, if the solvent and base are sufficiently volatile, or (ii) extraction of the insecticidal product with water after removal of the bulk of the solvent by distillation or by steam distillation.

If the solvent and free tertiary amine together make a system having low solubility in aqueous caustic soda and the desired product is preferentially soluble in the organic phase, then the following alternative procedure is adopted.

(b) A strong solution of caustic soda in water is added to the product which is then agitated, the quantity of caustic soda being chosen in excess of the requirements of the reaction:

$HNR_3Cl + NaOH = NaCl + NR_3 + H_2O$ and the quantity of water being preferably just sufficient to hold the sodium chloride formed in solution.

The salt solution is then separated off and (i) the solvent and tertiary amine are removed by distillation or steam distillation at normal or reduced pressure, or (ii) if the tertiary amine is considerably less volatile than the solvent and is itself a poor solvent for the desired product, the bulk of the latter is removed by distillation and the desired product then extracted from the residual tertiary amine by addition, with agitation, of a further amount of water.

The following examples illustrate how the process of invention may be carried into effect:

1. 76.5 gms. of phosphorus oxychloride and 101 gms. of triethylamine were added to 1000 gms. of chloroform. 45 gms. of dimethylamine dissolved in 150 gms. of chloroform were added, with mechanical stirring, at 40–45° C. during twenty minutes. The mixture was stirred for a further five minutes. No solid separated out.

A further 50.5 gms. of triethylamine and 7.0 gms. of water were then added and the mixture heated under reflux condenser for four hours, the liquid temperature being about 65° C. Gaseous ammonia was passed into the mixture, after cooling to 25° C. until the precipitation of ammonium chloride was complete.

The product was filtered and the filtrate distilled. A residue of 80 gms., consisting substantially of bis-dimethylamino phosphonous anhydride, was obtained. 98% of the triethylamine used was recovered in the distillate.

2. 50 mls. of chloroform, 230 gms. of methyldibutylamine and 68 gms. of phosphorus oxychloride were mixed. To the agitated cooled mixture was added 41 gms. of dimethylamine (97% purity), dissolved in 125 mls. of chloroform.

4 mls. of water were added, and the temperature raised to 80° C. and maintained there for three hours.

A strong solution of caustic soda in water was added to the product to decompose the methyl dibutylamine hydrochloride, in accordance with the equation given under (ii) (b) above and the solution of sodium chloride was separated. The chloroform was then distilled from the residue and the desired product extracted with water whereby 49 gms. of bis-dimethylamino phosphonous anhydride dissolved in 70 ml. of water (114 mls. of solution) were obtained.

3. 50 mls. of chloroform 248 gms. of N-diethylcyclohexylamine, and 76.5 gms. of phosphorus oxychloride were mixed. 45 gms. of dimethylamine were added dissolved in 150 mls. of chloroform. The temperature was raised to 80° C. and 4.5 mls. of water added. After four hours, the mixture was cooled to 50° C. and 107 gms. of caustic soda in 400 mls. of water added. After separation, 80 mls. of water were added to the chloroform layer, and the mixture distilled to a liquid temperature of 105° C. The middle layer formed was an aqueous solution of 42 gms. of bis-dimethylamino phosphonous anhydride in 64 mls. of water.

What we claim is:

1. A process for the manufacture of a lower bis-dialkylamino phosphonous anhydride which comprises reacting about two mols of an anhydrous lower dialkylamine with a solution of about one mol of phosphorus oxychloride in an inert solvent in the presence of at least two mols of a tertiary amine of a strength at least equal to that of pyridine, and reacting the product formed without separation thereof from the reaction mixture with about one-half mol of water in the presence of an amount of said tertiary amine equivalent to at least one mol thereof.

2. The process as defined in claim 1 in which enough of the tertiary amine is added during the first stage of the reaction to supply the required amount thereof during the second stage.

3. The process as defined in claim 1 in which the tertiary amine is a tertiary saturated alkylamine.

4. The process as defined in claim 1 in which the tertiary amine is an N-dialkyl cycloalkylamine.

5. The process as defined in claim 1 in which the tertiary amine is methyldibutylamine.

6. The process as defined in claim 1 in which the tertiary amine is an N-diethyl cycloalkylamine.

7. A process as defined in claim 1 in which the final reaction mixture is agitated with a strong aqueous solution of caustic soda, the resulting mixture is separated into an aqueous and a nonaqueous phase, and the residual tertiary amine and inert solvent are distilled from the nonaqueous phase.

8. A process for the manufacture of bis-dimethyl amino phosphonous anhydride which comprises reacting about two mols of anhydrous dimethylamine with a solution of about one mol of phosphorus oxychloride in an inert solvent in the presence of at least two mols of a tertiary amine of a strength at least equal to that of pyridine, and reacting the product formed without separation thereof from the reaction mixture with about one half mol of water in the presence of an amount of said tertiary amine equivalent to at least one mole thereof.

GILBERT SPENCER HARTLEY.
DENIS WILLIAM POUND.

(References on following page)

References Cited in the file of this patent

UNITED STATES PATENTS

| Number | Name | Date |
|---|---|---|
| 2,146,584 | Lipkin | Feb. 7, 1939 |
| 2,487,859 | Dickey et al. | Nov. 15, 1949 |
| 2,502,966 | Kosolapoff | Apr. 4, 1950 |

FOREIGN PATENTS

| Number | Country | Date |
|---|---|---|
| 23,752 | Australia | Jan. 5, 1949 |
| 631,549 | Great Britain | Nov. 4, 1949 |

OTHER REFERENCES

Ziele et al, "Ber. deut. chem.," vol 75, (1942), pp. 1127–33.

Michaelis "Liebigs Annalen," vol. 326, (1903), pp. 179 to 181.